United States Patent [19]

Lee

[11] 4,298,942
[45] Nov. 3, 1981

[54] NONLINEAR AMPLITUDE DETECTOR

[75] Inventor: Henry E. Lee, Columbia, Md.

[73] Assignee: The United States of America as represented by the Secretary of the Air Force, Washington, D.C.

[21] Appl. No.: 105,363

[22] Filed: Dec. 19, 1979

[51] Int. Cl.³ .................... G06F 15/20; G06F 7/552
[52] U.S. Cl. .................................. 364/483; 328/144;
343/5 NQ; 364/752
[58] Field of Search ............... 364/483, 752, 814;
343/5 NQ; 307/350, 355; 328/144, 146, 147,
149, 158; 329/50, 145

[56] References Cited

U.S. PATENT DOCUMENTS

| | | | |
|---|---|---|---|
| 3,281,846 | 10/1966 | King, Jr. ............................ | 343/107 |
| 3,699,463 | 10/1972 | Stone ................................. | 329/145 |
| 3,757,214 | 9/1973 | Kaufman .......................... | 324/83 Q |
| 3,761,829 | 9/1973 | Spaulding ......................... | 329/104 |
| 3,792,364 | 2/1974 | Ananias ............................ | 329/50 |
| 3,829,671 | 8/1974 | Gathright et al. ................. | 364/752 |
| 3,838,350 | 9/1974 | Ewanus et al. .................... | 329/104 |
| 3,858,036 | 12/1974 | Lunsford .......................... | 364/752 |
| 4,079,329 | 3/1978 | England et al. .................... | 329/50 |
| 4,173,017 | 10/1979 | Burlage et al. .................... | 343/5 NQ |

Primary Examiner—Jerry Smith
Attorney, Agent, or Firm—Donald J. Singer; Willard R. Matthews, Jr.

[57] ABSTRACT

A nonlinear amplitude detector generates signal amplitude from the signal's inphase and quadrature components based on a Binomial series expansion. The amplitude detector significantly reduces the processing requirement from an ideal square root operation and yet provides much improved error performance over a conventionally used linear amplitude detector. In operation, the inphase and quadrature signal components are compared for relative magnitude and the smaller magnitude signal component is squared and divided by the large magnitude signal component. The quotient from this operation is multiplied by a coefficient that is selected to provide desired amplitude error deviation characteristics. Signal amplitude is then determined by summing this product with the larger magnitude signal component.

8 Claims, 3 Drawing Figures

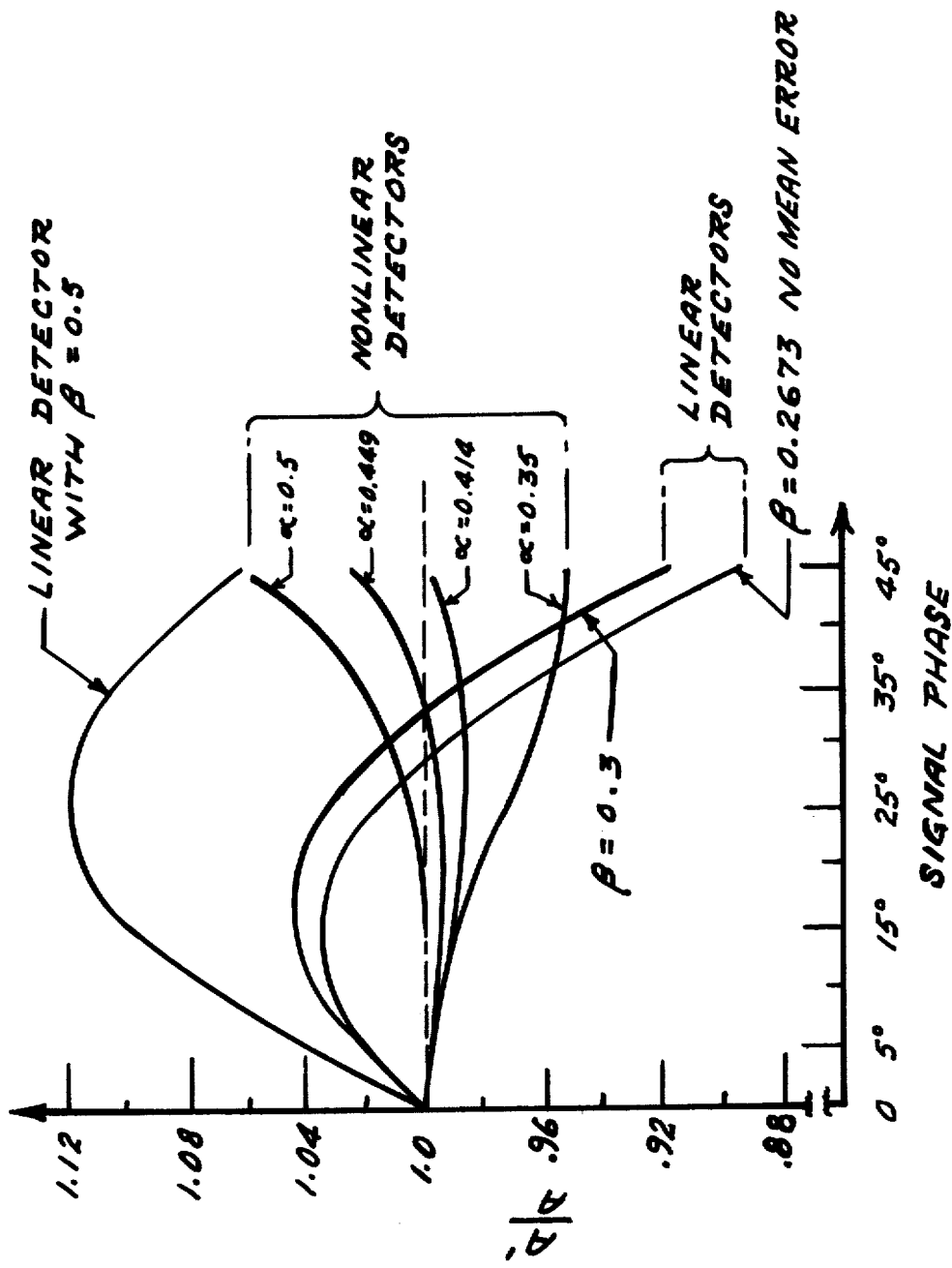

NONLINEAR AMPLITUDE DETECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates to radars and other systems employing electronic signal processing and in particular to means for determining signal amplitude from the inphase and quadrature signal components utilized in such systems.

An amplitude detection is usually required in the radar and sonar signal processing to recover the signal amplitude from its inphase (I) and quadrature (Q) components. Theoretically, the signal amplitude may be obtained by forming the square root of the sum of the squares of the I & Q components. To circumvent the square root operation which demands an extraordinary amount of processing hardware, the amplitude is conventionally approximated by a linear detector. In a linear amplitude detector, the magnitude of the I and Q components are first compared to determine which one is larger. The larger magnitude is then summed with a fraction of the smaller magnitude to obtain an estimate of the signal amplitude. This approach is described in detail by G. H. Robertson, *A Fast Amplitude Approximation for Quadrature Pairs*, Bell System Technical Journal Vol. 50, pp 2849-2853, October, 1971 and by Morio Onoe, *Fast Amplitude Approximation Yielding Either Exact Mean or Minimum Deviation for Quadrature Pairs*, proceedings of the IEEE, July 1972. A fraction value of 0.5 is used in the Robertson Technique and other fraction values have been considered by Onoe.

Despite its simplicity in implementation, however, the linear detectors are beset with large estimation errors. For instance, the Robertson approach yields an error of 8.7 percent in the estimation of mean and a maximum deviation of 11.8 percent.

Accordingly there currently exists the need for an amplitude detector that can be implemented with substantial savings in digital processing hardware over square root operations and that also provides improved error performance over linear detectors. The present invention is directed toward satisfying that need.

SUMMARY OF THE INVENTION

The nonlinear amplitude detector of the invention determines signal amplitude from its inphase and quadrature components. The smaller magnitude signal component is squared and divided by the larger magnitude signal component. The resultant term is multiplied by a coefficient $\alpha$ and the product is summed with the large magnitude signal component to provide the desired amplitude value. The coefficient $\alpha$ is a value selected from a range between 0.35 and 0.50. The detector is mechanized by means of a comparator that determines the relative magnitudes of the inphase and quadrature signal components; means for squaring the smaller magnitude signal component; an inverse function look-up table responsive to the larger magnitude signal component and a multiplier arranged to divide the squared term by the larger magnitude signal component; a second multiplier for multiplying that quotient with the coefficient $\alpha$; and summing means for summing that product with the larger magnitude signal component.

It is a principal object of the invention to provide a new and improved amplitude detector.

It is another object of the invention to provide a nonlinear amplitude detector that generates signal amplitude from the signal's inphase and quadrature components and that is based on Binomial series expansion.

It is another object of the invention to provide an amplitude detector that can be implemented with substantial savings in digital processing hardware over square root operation devices.

It is another object of the invention to provide an amplitude detector that demonstrates substantial error performance over linear detectors.

These together with other objects, advantages and features of the invention will become more readily apparent from the following detailed description taken in conjunction with the illustrative embodiment in the accompanying drawings.

DESCRIPTION OF THE DRAWINGS

FIG. 2 is a graph showing normalized outputs of linear and nonlinear amplitude detectors.

DETAILED DESCRIPTION OF THE PREFERRED EMBODIMENT

The present invention is a nonlinear amplitude detector that significantly reduces the amplitude estimation errors encountered in linear amplitude detectors. The signal processing equation of the invention is based on a Binomial series expansion of the square root operation. Only the first two terms of the expansion are retained for the purpose of minimizing the amount of processing hardware. More importantly, the use of a range of coefficient values, in addition to the 0.5 used in Binomial expansion have been considered and found to result in very desirable performance.

Figure 1:
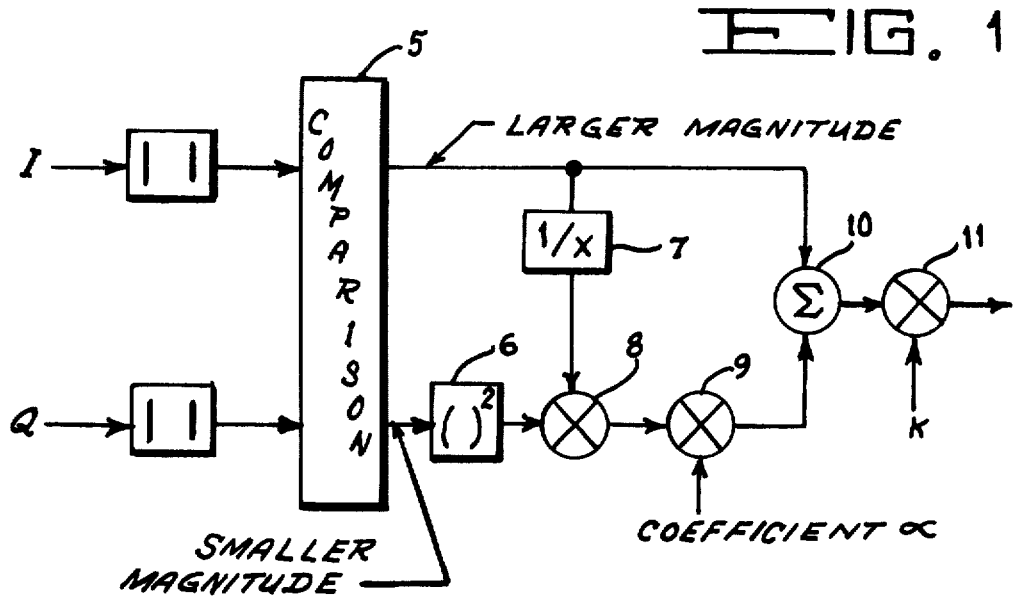
FIG. 1 is a block diagram of the nonlinear amplitude detector of the invention.

A functional block diagram of the invention is shown in FIG. 1. It comprises comparator means 5 which receives inphase and quadrature signal components and determines their relative magnitudes, squaring means 6, for squaring the smaller magnitude signal component, inverse function lookup table 7 and multiplier 8 which in combination effect division of the squared term by the larger magnitude signal component, multiplier 9 multiplying the quotient from multiplier 8 by the coefficient $\alpha$, and summing means 10 summing the larger magnitude signal component with the product from multiplier 9. In accordance with a further refinement of the invention multiplier 11 multiplies the device output by factor k.

In operation, as in the linear detector, the magnitude of the I and Q components are first compared to determine which one is larger. The larger magnitude is then summed with a term which is the product of coefficient $\alpha$ with the square of the smaller magnitude divided by the larger magnitude, assuming the inphase component has a larger magnitude, the processing equation is $$A' = |I| + \alpha \frac{Q^2}{|I|}$$

The inverse function can be implemented with a look-up table, whereas the other processing functions may be implemented on a microprocessor.

FIG. 2 shows the normalized amplitude outputs of both the conventional linear and the nonlinear detector of the invention as a function of the phase angle of the I and Q pair. The curve is reflected from $\pi/4$ to $\pi/2$ and then repeated for the third and fourth quadrants. It is observed that the deviation of the nonlinear amplitude detector output from the actual value is much smaller than that of the linear detector with a choice of coefficient $\alpha$ between 0.35 and 0.5. Assuming the phase angle of the I and Q pairs is uniformly distributed between 0 and $2\pi$, the mean and standard deviation as a function of $\alpha$ are calculated and plotted on FIG. 3. Included in FIG. 3 are plots of the minimum and maximum detector outputs.

Figure 3:
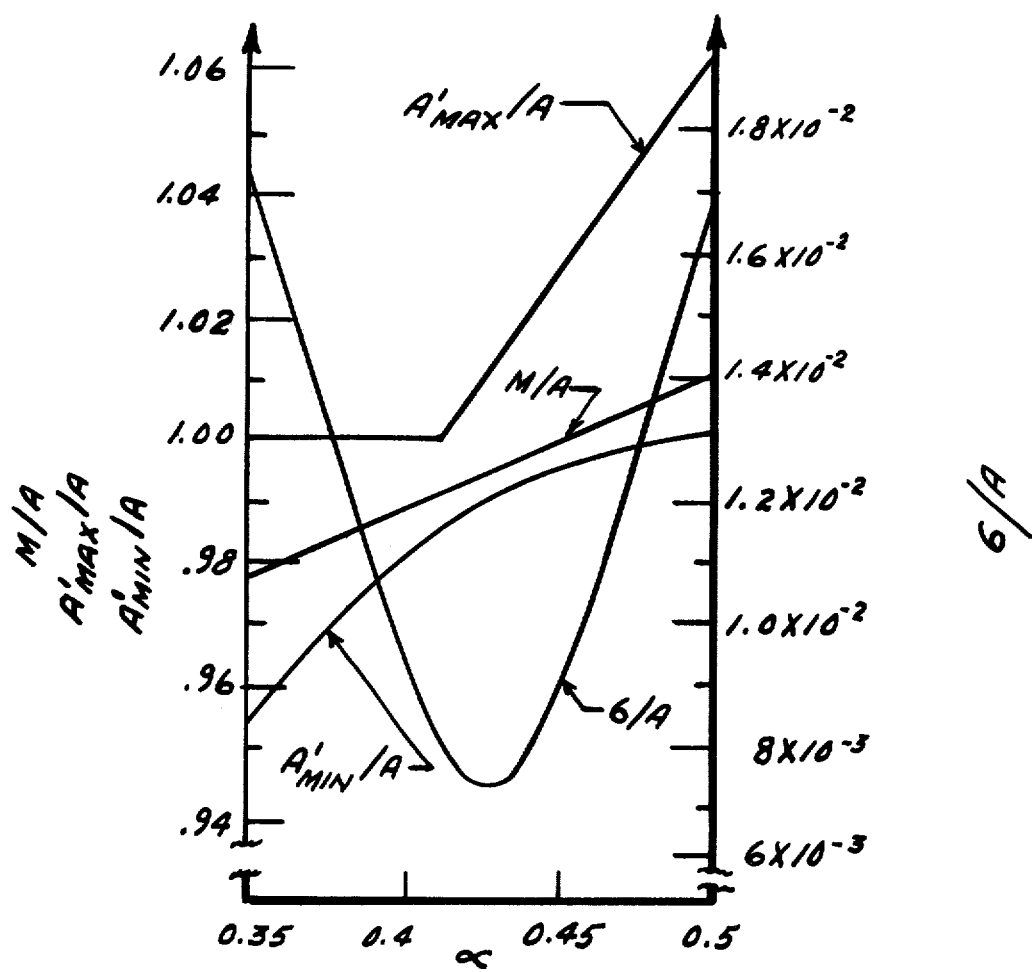
FIG. 3 is a graph showing the mean, standard deviation, maximum and minimum values for the coefficient $\alpha$ between 0.35 and 0.5.

FIG. 3 can be used for the proper selection of coefficient $\alpha$. For example, a choice of $\alpha = 0.449$ will give no error in the mean value but $8.7 \times 10^{-3}A$ in standard deviation. The maximum deviation at this value of $\alpha$ is 2.5%. At $\alpha$ around 0.43, the maximum deviation is the smallest, which is approximately 1%. The mean value of the detector output at this choice of $\alpha$ is 0.995A or 0.5% in error. The standard deviation is the smallest, $7.4 \times 10^{-3}A$, at $\alpha = 0.428$. Based on these accuracy results, it is demonstrated that the nonlinear amplitude detector of the invention will provide superior error performance over linear detectors. Although it involves slightly more complicated processing than the linear detector, the invention can be readily implemented with currently available processing hardware.

It is to be emphasized that the actual savings in digital processing hardware in implementing this invention over a straightforward square root operation is quite significant. For instance, for an input with 10 bit I and Q each, the hardware for a 20 bit table lookup for the square root operation is 1024 times that of a 10 bit table lookup for the inversion operation.

A more general form of the invention involves an additional multiplication of the previously described processing equation by a constant k which is very close to 1. Through this additional multiplication, the mean of the detector output can be modified to any desired value. This is accomplished by means of multiplier 11 of FIG. 1.

The mean value of the nonlinear detector output is derived as follows:

$$M = E\,A'$$
$$= \frac{4A}{\pi} \int_0^{\pi/4} (\cos\theta + \alpha \sin\theta \tan\theta)\,d\theta$$
$$= \frac{4A}{\pi} \left[\sin\theta - \alpha\sin\theta + \alpha \ln\tan\left(\frac{\pi}{4} + \frac{\theta}{2}\right)\right]_0^{\pi/4}$$
$$= \frac{4A}{\pi} \left[\frac{\sqrt{2}}{2} - \alpha\frac{\sqrt{2}}{2} + \alpha \ln\tan\left(\frac{3\pi}{8}\right)\right]$$
$$= A(0.9003 + 0.2219\,\alpha)$$

The value of $\alpha$ which generates exact mean can be obtained by letting $M/A = 1$ in the above equation. $\alpha$ is found to be 0.449 for zero mean error. The standard deviation $\sigma$ is obtained by $$\sigma^2 = E\{[A' - M]^2\}$$
$$= E\{A'^2\} - M^2$$

Now $$E\{A'^2\} = \frac{4A^2}{\pi} \int_0^{\pi/4} (\cos\theta + \alpha \sin\theta \tan\theta)^2\,d\theta$$
$$= \frac{4A^2}{\pi} \int_0^{\pi/4} (\cos^2\theta + 2\alpha \sin^2\theta + \alpha^2 \sin^2\theta \tan^2\theta)\,d\theta$$
$$= \frac{4A^2}{\pi} \left[2\alpha\theta + (1 - 2\alpha)\left(\frac{\theta}{2} + \tfrac{1}{4}\sin 2\theta\right)\right]_0^{\pi/4} + \frac{4A^2\alpha^2}{\pi} \int_0^{\pi/4} \frac{\sin^4\theta}{\cos^2\theta}\,d\theta$$
$$= A^2\left[\left(\tfrac{1}{2} + \frac{1}{\pi}\right) + \left(1 - \frac{2}{\pi}\right)\alpha + \left(\frac{5}{\pi} - \frac{3}{2}\right)\alpha^2\right]$$
$$= A^2(0.8183 + 0.3634\,\alpha + 0.915\alpha^2)$$

Therefore $$\sigma^2 = A^2[(0.8183 + 0.3634\,\alpha + 0.0915\alpha^2) - (0.9003 + 0.2219\alpha)^2]$$
$$= A^2(0.0078 - 0.0362\alpha + 0.0423\alpha^2)$$

The value of $\alpha$ at which the standard deviation is minimum is found by letting $$(d\sigma^2/d\alpha) = -0.0362 + 2\alpha(0.0423) = 0$$

The result is $\alpha = 0.0428$.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. A nonlinear amplitude detector comprising
  comparator means receiving the inphase and quadrature components of a signal and determining the relative magnitude thereof,
  signal component squaring means squaring the smaller magnitude signal component,
  means for dividing the squared smaller magnitude signal component by the larger magnitude signal component,
  first multiplier means multiplying the quotient thereof by a coefficient $\alpha$, and
  means for summing the output of said multiplier means with the larger magnitude signal component.

2. A nonlinear amplitude detector as defined in claim 1 wherein said means for dividing the squared smaller magnitude signal component by the larger magnitude signal component comprises a
  a second multiplier means and
  an inverse function look-up table, said inverse function look-up table being accessed by and having an output responsive to the larger magnitude signal component, said second multiplier means receiving the outputs of said signal component squaring means and said look-up table and feeding said first multiplier means.

3. A nonlinear amplitude detector as defined in claim 2 wherein said coefficient $\alpha$ is a value selected from a range between 0.35 and 0.50.

4. A nonlinear amplitude detector as defined in claim 3 including a third multiplier means multiplying the output of said summing means by a constant k.

5. A nonlinear amplitude detector as defined in claim 4 wherein said constant k is unity.

6. A nonlinear amplitude detector as defined in claim 2 wherein said coefficient $\alpha$ is 0.449.

7. A nonlinear amplitude detector as defined in claim 2 wherein said coefficient $\alpha$ is 0.428.

8. A nonlinear amplitude detector as defined in claim 2 wherein said coefficient $\alpha$ is 0.430.

* * * * *